(12) United States Patent
Sakata

(10) Patent No.: US 12,442,110 B2
(45) Date of Patent: Oct. 14, 2025

(54) METHOD FOR SEPARATING FIBERS AND METHOD FOR PRODUCING MODACRYLIC FIBER, POLYVINYL CHLORIDE FIBER AND POLYESTER FIBER

(71) Applicant: KANEKA CORPORATION, Osaka (JP)

(72) Inventor: Sho Sakata, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 18/616,589

(22) Filed: Mar. 26, 2024

(65) Prior Publication Data

US 2024/0328036 A1 Oct. 3, 2024

(30) Foreign Application Priority Data

Mar. 27, 2023 (JP) ................. 2023-050111

(51) Int. Cl.
| | | |
|---|---|---|
| *D01F 6/40* | (2006.01) | |
| *D01F 1/10* | (2006.01) | |
| *D01F 6/10* | (2006.01) | |
| *D01F 6/62* | (2006.01) | |

(52) U.S. Cl.
CPC ............... *D01F 6/40* (2013.01); *D01F 1/10* (2013.01); *D01F 6/10* (2013.01); *D01F 6/62* (2013.01)

(58) Field of Classification Search
CPC ..... D01F 6/10; D01F 6/40; D01F 6/62; D01F 1/10; B29B 17/02; B29B 2017/0244
See application file for complete search history.

(56) References Cited

U.S. PATENT DOCUMENTS

| | | | | | |
|---|---|---|---|---|---|
| 3,736,223 | A | * | 5/1973 | Marsh ................. | B03B 9/06 |
| | | | | | 241/DIG. 38 |
| 5,248,041 | A | * | 9/1993 | Deiringer ............ | B03B 1/04 |
| | | | | | 521/46.5 |
| 5,252,614 | A | * | 10/1993 | Sisson .................. | B29B 17/02 |
| | | | | | 521/46.5 |
| 5,919,717 | A | * | 7/1999 | Wallick ................ | B29B 17/04 |
| | | | | | 428/903.3 |
| 6,322,851 | B1 | * | 11/2001 | Adachi ................ | D06N 3/0004 |
| | | | | | 427/419.7 |
| 6,607,637 | B1 | * | 8/2003 | Vinson ................ | D21H 17/71 |
| | | | | | 162/158 |
| 2002/0112831 | A1 | * | 8/2002 | Barnholtz ............ | D21H 21/22 |
| | | | | | 162/168.3 |
| 2004/0074509 | A1 | | 4/2004 | Murata et al. | |
| 2004/0144511 | A1 | * | 7/2004 | McKay ................ | D21H 21/24 |
| | | | | | 162/158 |
| 2005/0173310 | A1 | * | 8/2005 | Bork .................... | B29B 17/04 |
| | | | | | 209/172 |
| 2007/0155870 | A1 | | 7/2007 | Kowaki et al. | |
| 2015/0038631 | A1 | * | 2/2015 | Hamaguchi ........ | C08K 3/34 |
| | | | | | 524/449 |
| 2016/0229982 | A1 | * | 8/2016 | Phillips .............. | C08G 18/7664 |

FOREIGN PATENT DOCUMENTS

| | | | | | |
|---|---|---|---|---|---|
| BR | 112021011473 | A2 | * | 8/2021 | ........ C08B 16/00 |
| CN | 101223315 | A | * | 7/2008 | ........ D21C 5/025 |
| CN | 112853535 | A | * | 5/2021 | ........ A41G 3/0083 |
| GB | 1412933 | A | * | 11/1975 | ........ B03B 9/06 |
| GB | 1543770 | A | * | 4/1979 | ........ B03B 5/28 |
| JP | 2002-227018 | A | | 8/2002 | |
| JP | 2003-328222 | A | | 11/2003 | |
| WO | 2005/056894 | A1 | | 6/2005 | |
| WO | 2008/026538 | A1 | | 3/2008 | |

OTHER PUBLICATIONS

Translation BR 112021011473.*
Translation CN 101223315.*
Translation CN 112853535.*

* cited by examiner

*Primary Examiner* — Shaun R Hurley
(74) *Attorney, Agent, or Firm* — Osha Bergman Watanabe & Burton LLP

(57) ABSTRACT

A method for separating fibers that separates a modacrylic fiber, a polyvinyl chloride fiber and a polyester fiber and a method for producing fibers using these fibers obtained by the method for separating fibers are provided. A method for separating fibers contained in a fiber mixture from the fiber mixture, includes a step of mixing the fiber mixture containing at least two selected from a modacrylic fiber, a polyvinyl chloride fiber and a polyester fiber, and a liquid mixture containing calcium chloride, a nonionic surfactant and water. A method for producing a fiber includes a separation step of mixing a fiber mixture containing at least two selected a modacrylic fiber, a polyvinyl chloride fiber and a polyester fiber, and a liquid mixture containing calcium chloride, a nonionic surfactant and water, and a step of spinning a raw material obtained from a fiber separated in the separation step.

6 Claims, No Drawings

METHOD FOR SEPARATING FIBERS AND METHOD FOR PRODUCING MODACRYLIC FIBER, POLYVINYL CHLORIDE FIBER AND POLYESTER FIBER

TECHNICAL FIELD

The present invention relates to a method for separating a modacrylic fiber, a polyvinyl chloride fiber and a polyester fiber. In particular, the present invention relates to the method for separating the modacrylic fiber, the polyvinyl chloride fiber and the polyester fiber, which is useful for recycling fibers used in artificial hairs.

Further, the present invention relates to a method for producing the modacrylic fiber, the polyvinyl chloride fiber and the polyester fiber.

BACKGROUND ART

Modacrylic fiber, polyvinyl chloride fiber, polyvinylidene chloride fiber, polyester fiber, nylon fiber, polypropylene fiber and the like are generally used as fiber for artificial hairs used in wigs, hair pieces, doll headdresses and the like.

Among them, modacrylic fiber, polyvinyl chloride fiber and polyester fiber are widely used as the fiber for the artificial hairs due to their characteristics.

Polyvinyl chloride resin has excellent self-extinguishing properties and chemical resistance and can have these excellent properties even when made into a fiber. When artificial hairs are worn on the head in various shapes, self-extinguishing properties are an important necessary property for safety.

In addition, artificial hairs using the polyvinyl chloride fiber has a feature that its appearance and texture are similar to human hairs and is also highly used for its cosmetic properties (For example, Patent Document 1).

On the other hand, modacrylic fiber obtained from modacrylic resin copolymerized with acrylonitrile and vinyl halide and/or vinylidene halide has advantage of being very similar to human hairs in texture, luster, and volume, as well as being easy to comb. Therefore, the modacrylic fiber has very excellent properties as fiber for artificial hairs (For example, Patent Documents 2 and 3).

In addition, polyester fiber whose main component is polyester resin, such as polyethylene terephthalate, have excellent heat resistance, making it possible to set curls using beauty heat equipment such as hair irons. Therefore, the polyester fiber have excellent properties as fiber for artificial hairs in that they can be adapted to various hairstyles (For example, Patent Document 4).

PRIOR ART DOCUMENT

Patent Document

Patent Document 1: WO 2008/026538
Patent Document 2: JP-A 2002-227018
Patent Document 3: JP-A 2003-328222
Patent Document 4: WO 2005/056894

SUMMARY OF THE INVENTION

Problem to be Solved by the Invention

As quality of such artificial hairs improves, it is becoming as natural as human hairs, and its market is expanding. Therefore, the production amount of the artificial hairs is increasing year by year, and the amount of the artificial hairs that is discarded due to deterioration and the like is also increasing.

In recent years, as awareness of environmental issues has increased, synthetic fibers are also required to have recyclability. Therefore, there is a need for a method for separating various fiber mixtures collected and shredded by raw materials in the recycling process of fibers used in the artificial hairs.

However, as mentioned above, the artificial hairs is made from various fibers such as modacrylic fiber, polyvinyl chloride fiber, polyester fiber, polypropylene fiber and nylon fiber, and when disposed of the artificial hairs, these fibers are mixed together. Therefore, it is necessary to separate these fibers for recycling.

In particular, modacrylic fiber, polyvinyl chloride fiber and polyester fiber account for a large proportion of the artificial hairs, and it is important to separate these three fibers.

Accordingly, an object of the present invention is to provide a method for separating fibers that separates a modacrylic fiber, a polyvinyl chloride fiber and a polyester fiber.

In particular, an object of the present invention is to provide a simpler and lower-cost method for separating fibers.

The present invention also provides a method for producing these fibers using the modacrylic fiber, the polyvinyl chloride fiber or the polyester fiber separated by the above method.

Means for Solving the Problem

In a method for separating a modacrylic fiber, a polyvinyl chloride fiber and a polyester fiber based on their differences in specific gravity, it has been found that simply by optimizing the specific gravity of a liquid used for separation, fibers float that on the liquid contrary to the specific gravity are generated, and these fibers sufficiently cannot be separated. The present inventor conducted studies to solve the above problems and found that the modacrylic fiber, the polyvinyl chloride fiber and the polyester fiber can be sufficiently separated by using a combination of a type of compound to optimize the specific gravity and a specific type of surfactant, and the present inventor has completed the present invention.

That is, the present invention relates to:

[1] A method for separating fibers contained in a fiber mixture from the fiber mixture, the method comprising:
a step of mixing the fiber mixture containing at least two selected from the group consisting of a modacrylic fiber, a polyvinyl chloride fiber and a polyester fiber, and a liquid mixture containing calcium chloride, a nonionic surfactant and water.

Further, the present invention relates to:

[2] The method for separating fibers according to the above [1], wherein a specific gravity of the liquid mixture is 1.25 or more and 1.45 or less;

[3] The method for separating fibers according to the above [1] or [2], wherein a concentration of the nonionic surfactant in the liquid mixture is 0.05% by mass or more and 5% by mass or less;

[4] The method for separating fibers according to any one of the above [1] to [3], wherein the nonionic surfactant contains polyoxyethylene sorbitan fatty acid ester; and

[5] The method for separating fibers according to any one of the above [1] to [4], wherein a concentration of the calcium chloride in the liquid mixture is 31% by mass or more and 45% by mass or less.

Further, the present invention relates to:

[6] A method for producing a fiber, the method comprising:

a separation step of mixing a fiber mixture containing at least two selected from the group consisting of a modacrylic fiber, a polyvinyl chloride fiber and a polyester fiber, and a liquid mixture containing calcium chloride, a nonionic surfactant and water; and a step of spinning a raw material containing a fiber separated in the separation step.

Effects of the Invention

According to the present invention, there is provided a method for separating fibers that separates a modacrylic fiber, a polyvinyl chloride fiber and a polyester fiber from a fiber mixture containing at least two selected from the group consisting of these fibers. In particular, according to the present invention, a simpler and lower-cost separation method is provided.

Further, there is also provided a method for producing these fibers using a modacrylic fiber, a polyvinyl chloride fiber or a polyester fiber separated.

MODE FOR CARRYING OUT THE INVENTION

Hereinafter, the present invention will be explained based on its preferred embodiments.

A method for separating fibers of the present invention (hereinafter also referred to as "present separation method") includes a step of mixing a mixture containing at least two selected from the group consisting of a modacrylic fiber, a polyvinyl chloride fiber and a polyester fiber, and a liquid mixture containing calcium chloride, a nonionic surfactant and water and separates fibers contained in the fiber mixture from the fiber mixture.

That is, the present separation method is a method for separating the modacrylic fiber and the polyvinyl chloride fiber in the case of a mixture containing the modacrylic fiber and the polyvinyl chloride fiber, a method for separating the modacrylic fiber and the polyester fiber in the case of a mixture containing the modacrylic fiber and the polyester fiber, a method for separating the polyvinyl chloride fiber and the polyester fiber in the case of a mixture containing the polyvinyl chloride fiber and the polyester fiber, or a method for separating the modacrylic fiber, the polyvinyl chloride fiber and the polyester fiber in the case of a mixture containing the modacrylic fiber, the polyvinyl chloride fiber and the polyester fiber.

As described above, the modacrylic fiber used in the present separation method is a fiber obtained from a modacrylic resin obtained by copolymerizing acrylonitrile with vinyl halide and/or vinylidene halide.

The polyvinyl chloride fiber used in the present separation method is a fiber obtained from a homopolymer of vinyl chloride or a polyvinyl chloride resin, which is a copolymer containing vinyl chloride as a main component.

The polyester fiber used in the present separation method is a fiber obtained from a polyester resin that is a condensation polymer of polyalcohol and polyhydric carboxylic acid. Examples of the polyalcohol include ethylene glycol, 1,3-propanediol, 1,4-butanediol and 1,4-cyclohexanedimethanol.

Examples of the polyhydric carboxylic acid include terephthalic acid and 2,6-naphthalene dicarboxylic acid. As the polyester fiber, polyethylene terephthalate fiber obtained from polyethylene terephthalate resin, which is a condensation polymer of ethylene glycol and terephthalic acid, is preferable.

The mixture containing at least two selected from the group consisting of the modacrylic fiber, the polyvinyl chloride fiber and the polyester fiber (hereinafter also referred to as "present fiber mixture") is a mixture containing the modacrylic fiber, the polyvinyl chloride fiber and the polyester fiber that are subject to collection and recycling, from which artificial hairs using these fibers has been discarded due to deterioration or consumption, and the mixture may contain components other than these fibers.

Components other the modacrylic the than fiber, polyvinyl chloride fiber and the polyester fiber include non-resin components contained in wigs, hair extensions, and the like containing artificial hairs, and their crushed materials, fibers and molded products made of resins other than the modacrylic fiber, the polyvinyl chloride fiber and the polyester fiber and the like. Examples of fibers made of resins other than the modacrylic fiber, the polyvinyl chloride fiber and the polyester fiber include a polypropylene fiber and a nylon fiber.

When the present mixture fiber contains components other than the modacrylic fiber, the polyvinyl chloride fiber and the polyester fiber, it is preferable to remove these components in advance and subject it to the present separation method.

For example, when the present fiber mixture contains the modacrylic fiber and the polyvinyl chloride fiber and the mixture further contains metals or metal salts, a method may be used in which the metals or the metal salts are separated from the mixture containing the modacrylic fiber and the polyvinyl chloride fiber by dissolving, magnetic force, or the like.

Further, when the mixture containing the modacrylic fiber and the polyvinyl chloride fiber further contains polypropylene fibers or nylon fibers, a method may be used in which these fibers are separated from the mixture containing the modacrylic fiber and the polyvinyl chloride fiber by electrostatic separation or the like.

Even when the present fiber mixture contains the modacrylic fiber and the polyester fiber, the polyvinyl chloride fiber and the polyester fiber, or the modacrylic fiber, the polyvinyl chloride fiber and the polyester fiber, the metals, the metal salts and other fibers can be separated from the mixture in the same manner as described above.

It is preferable that components other than those mentioned above be separated from the present fiber mixture by an appropriate separation method depending on their forms, raw materials, and the like, and then the mixture is subjected to the present separation method.

In the present separation method, when the fiber mixture contains components other than the modacrylic fiber, the polyvinyl chloride fiber and the polyester fibers, the present fiber mixture preferably contains a total of 70% by mass or more of at least two selected from the group consisting of the modacrylic fiber, the polyvinyl chloride fiber and the polyester fiber, with the total mass of the fiber mixture being 100% by mass, more preferably 80% by mass or more, even more preferably 95% by mass or more, and particularly preferably 100% by mass. When the present fiber mixture contains the modacrylic fiber, the polyvinyl chloride fiber and the polyester fiber, the total amount of these fibers is preferably within the above range, with the total mass of the present fiber mixture being 100% by mass.

When the fibers contained in the present fiber mixture are the modacrylic fiber and the polyvinyl chloride fiber, as for a ratio of the modacrylic fiber to the polyvinyl chloride fiber, the mass of the polyvinyl chloride fiber is preferably 0.1 or more and 10 or less, more preferably 0.5 or more and 5 or less, and even more preferably 0.8 or more and 1.2 or less, with the mass of the modacrylic fiber being 1.

When the fibers contained in the present fiber mixture are the modacrylic fiber and the polyester fiber, as for a ratio of the modacrylic fiber to the polyester fiber, the mass of the polyester fiber is preferably 0.1 or more and 10 or less, more preferably 0.5 or more and 5 or less, and even more preferably 0.8 or more and 1.2 or less, with the mass of the modacrylic fiber being 1.

When the fibers contained in the present fiber mixture are the polyvinyl chloride fiber and the polyester fiber, as for a ratio of the polyvinyl chloride fiber to the polyester fiber, the mass of the polyester fiber is preferably 0.1 or more and 10 or less, more preferably 0.5 or more and 5 or less, and even more preferably 0.8 or more and 1.2 or less, with the mass of the polyvinyl chloride fiber being 1.

When the fibers contained in the present fiber mixture are the modacrylic fiber, the polyvinyl chloride fiber and the polyester fiber, as for a ratio of the modacrylic fiber, the polyvinyl chloride fiber and the polyester fiber, the mass of the polyvinyl chloride fiber is preferably 0.1 or more and 10 or less, more preferably 0.5 or more and 5 or less, and even more preferably 0.8 or more and 1.2 or less, with the mass of the modacrylic fiber being 1. Similarly, the mass of the polyester fiber is preferably 0.1 or more and 10 or less, more preferably 0.5 or more and 5 or less, and even more preferably 0.8 or more and 1.2 or less.

The present fiber mixture is mixed with a liquid mixture containing calcium chloride, a nonionic surfactant and water (hereinafter also referred to as "present liquid mixture").

From the viewpoint of separation efficiency of the fibers and cleaning of the fibers after separation, the liquid mixture is preferably in the form of an aqueous solution in which the calcium chloride and the nonionic surfactant are uniformly dissolved.

It is thought that the calcium chloride contained in the present liquid mixture has a role of adjusting a specific gravity of the present liquid mixture to a specific gravity appropriate for separating the fibers contained in the present fiber mixture.

Although the details are unknown, it is thought that inorganic salts other than the calcium chloride, such as potassium carbonate, do not have sufficient compatibility with the nonionic surfactant, resulting in insufficient separation of the fibers in the present fiber mixture.

When the fibers contained in the present fiber mixture are the modacrylic fiber and the polyvinyl chloride fiber, from the viewpoint of adjusting the specific gravity of the present liquid mixture to an appropriate specific gravity for separating the modacrylic fiber and the polyvinyl chloride fiber, the specific gravity of the liquid mixture is preferably 1.25 or more and 1.40 or less, more preferably 1.27 or more and 1.36 or less, even more preferably 1.28 or more and 1.32 or less, and particularly preferably 1.29 or more and 1.31 or less.

When the fibers contained in the present fiber mixture are the modacrylic fiber and the polyester fiber, from the viewpoint of adjusting the specific gravity of the present liquid mixture to an appropriate specific gravity for separating the modacrylic fiber and the polyester fiber, the specific gravity of the liquid mixture is preferably 1.25 or more and 1.45 or less, more preferably 1.30 or more and 1.43 or less, even more preferably 1.35 or more and 1.42 or less, and particularly preferably 1.39 or more and 1.41 or less.

When the fibers contained in the present fiber mixture are the polyvinyl chloride fiber and the polyester fiber, from the viewpoint of adjusting the specific gravity of the present liquid mixture to an appropriate specific gravity for separating the polyvinyl chloride fiber and the polyester fiber, the specific gravity of the liquid mixture is preferably 1.35 or more and 1.45 or less, more preferably 1.37 or more and 1.43 or less, even more preferably 1.38 or more and 1.42 or less, and particularly preferably 1.39 or more and 1.41 or less.

When the fibers contained in the present fiber mixture are the modacrylic fiber, the polyvinyl chloride fiber and fiber, the polyester from the viewpoint of adjusting the specific gravity of the present liquid mixture to an appropriate specific gravity for separating the modacrylic fiber, the polyvinyl chloride and fiber the polyester fiber, the specific gravity of the liquid mixture is preferably 1.25 or more and 1.45 or less, more preferably 1.30 or more and 1.43 or less, even more preferably 1.35 or more and 1.42 or less, and particularly preferably 1.39 or more and 1.41 or less.

The content of the calcium chloride in the present liquid mixture is preferably in a range in which the calcium chloride is dissolved in the present liquid mixture, and from the viewpoint of the specific gravity of the present liquid mixture, the content of the calcium chloride in the present liquid mixture is more preferably 31% by mass or more and 34% by mass or less, with the mass of the present liquid mixture being 100% by mass.

The nonionic surfactant contained in the present liquid mixture is a general term for surfactants that do not have a group that dissociates into ions. Ether type, ester type, ether ester type or the like are known as nonionic surfactants.

Ether-type nonionic surfactants are surfactants obtained by mainly adding ethylene oxide to raw materials with hydroxyl groups such as higher alcohols and alkylphenols. As ether-type nonionic surfactants, polyoxyethylene alkyl ether, polyoxyethylene alkyl phenyl ether and other ether-type surfactants are known.

Ester-type nonionic surfactants have a structure in which a polyhydric alcohol such as glycerin, sorbitol, or sucrose and a fatty acid are ester-bonded. As ester-glycerin type nonionic surfactants, fatty acid esters, sorbitan fatty acid esters and sucrose fatty acid esters are known.

An ether ester type nonionic surfactant is surfactant obtained by adding ethylene oxide to an ester consisting of a polyhydric alcohol such as glycerin or sorbitol and a fatty acid. It has both ester bonds and ether bonds in its molecule.

Examples of these nonionic surfactants include sorbitan fatty acid esters, glycerin fatty acid ester, propylene glycol fatty acid ester, polyethylene glycol fatty acid ester, sucrose fatty acid ester, polyoxyethylene fatty acid ester, polyoxyethylene sorbitan fatty acid ester, polyoxyethylene alkyl ether, polyoxyethylene sorbitol fatty acid ester, polyoxyethylene glycerin fatty acid ester, polyoxyethylene propylene glycol fatty acid ester, polyoxyethylene castor oil, polyoxyethylene phytostanol ether, polyoxyethylene cholestanol ether, alkyl glyceryl ether modified silicone, polyether modified silicone and the like.

Among the nonionic surfactants, polyoxyethylene sorbitan fatty acid ester is preferred.

Examples of polyoxyethylene sorbitan fatty acid esters include polyoxyethylene sorbitan monolaurate, polyoxyethylene sorbitan monopalmitate, polyoxyethylene sorbitan monostearate, polyoxyethylene sorbitan monooleate, polyoxyethylene sorbitan triolate, polyoxyethylene sorbitan triisostearate and the like.

Among the polyoxyethylene sorbitan fatty acid esters, polyoxyethylene sorbitan monolaurate and polyoxyethylene sorbitan monooleate are preferred.

The present liquid mixture may contain one or more types of nonionic surfactants. It is preferable that at least one of the nonionic surfactants contained in the present liquid mixture is the polyoxyethylene sorbitan fatty acid ester, and it is more preferable that the present liquid mixture contains at least one of polyoxyethylene sorbitan monolaurate and polyoxyethylene sorbitan monooleate.

It is considered that the presence of the nonionic surfactant in the present liquid mixture improves wettability of the fibers, the surface tension of the present liquid mixture and affinity between the present liquid mixture and the fiber surface, so that the modacrylic fiber and the polyvinyl chloride fiber are sufficiently separated.

From the viewpoint of separation efficiency, the concentration of the nonionic surfactant in the present liquid mixture is preferably 0.05% by mass or more and 5% by mass or less, more preferably 0.1% by mass or more and 2.5% by mass or less, and more preferably 0.2% by mass or more and 1.25% by mass or less.

When the present liquid mixture contains multiple types of nonionic surfactants, the above concentration is the total concentration of the nonionic surfactants contained in the present liquid mixture.

Examples of surfactants contained in the present liquid mixture cationic include surfactants, anionic surfactants, amphoteric surfactants or the like, but in the present separation method, a sufficient separation effect cannot be obtained using only a surfactant other than the nonionic surfactant.

The present separation method separates each fiber contained in the present fiber mixture by mixing the present fiber mixture and the present liquid mixture.

When the fibers contained in the present fiber mixture are the modacrylic fiber and the polyvinyl chloride fiber, the modacrylic fiber has a lower specific gravity than the polyvinyl chloride fiber, so the modacrylic fiber floats on the top of the present liquid mixture, and the polyvinyl chloride fiber settles to the bottom of the present liquid mixture.

When the fibers contained in the present fiber mixture are the modacrylic fiber and the polyester fiber, the modacrylic fiber has a lower specific gravity than the polyester fiber, so the modacrylic fiber floats on the top of the present liquid mixture, and the polyester fiber settles to the bottom of the present liquid mixture.

When the fibers contained in the present fiber mixture are the polyvinyl chloride fiber and the polyester fiber, the polyvinyl chloride fiber has a lower specific gravity than the polyester fiber, so the polyvinyl chloride fiber floats on the top of the present liquid mixture, and the polyester fiber settles to the bottom of the present liquid mixture.

When the fibers contained in the present fiber mixture are the modacrylic fiber, the polyvinyl chloride fiber and the polyester fiber, the specific gravities of these fibers increases in the order of the modacrylic fiber, the polyvinyl chloride fiber and the polyester fiber. Therefore, it is often the case that (A) the modacrylic fiber floats on the top of the present liquid mixture, and the polyvinyl chloride fiber and the polyester fiber settle to the bottom of the present liquid mixture, or (B) the modacrylic fiber and the polyvinyl chloride fiber float on the top of the present liquid mixture and the polyester fiber settles to the bottom of the present liquid mixture.

In the case of (A), for example, the three types of fibers can be separated by first separating the modacrylic fiber and then separating the mixture of the polyvinyl chloride fiber and the polyester fiber again by the above method.

In the case of (B), for example, the three types of fibers can be separated by first separating the polyester fiber, and then separating the mixture of the modacrylic fiber and the polyvinyl chloride fiber again by the above method.

When mixing the present fiber mixture and the present liquid mixture, it is not necessary to prepare the liquid mixture of the calcium chloride, the nonionic surfactant and the water in advance, and the fiber mixture, the calcium chloride, the nonionic surfactant and water may be mixed sequentially. Alternatively, the fiber mixture may be mixed with a liquid mixture of any two of the calcium chloride, the nonionic surfactant and water, and then the remaining one may be mixed. As for the mixing method, it is preferable to mix the calcium chloride, the nonionic surfactant and water to prepare a uniformly dissolved aqueous solution, and then mix this with the present fiber mixture.

Further, when mixing the present fiber mixture and the present liquid mixture, the present liquid mixture may be added in a plurality of times, or the present fiber mixture may be added in in a plurality of times.

If necessary, any of the calcium chloride, the nonionic surfactant and the water may be added after mixing the present fiber mixture and the present liquid mixture.

In order to sufficiently enhance the separation effect, it is preferable to mix and stir the present fiber mixture and the present liquid mixture. Stirring is usually performed at room temperature, for example at a temperature of 20° C. or higher and 60° C. or lower.

Stirring is performed using a commonly used stirrer such as a stirring bar or stirring blade.

The rotational speed of stirring may be, for example, 300 rpm or more, preferably 500 rpm or more. The upper limit of the rotation speed is preferably 1500 rpm or less, more preferably 1000 rpm or less, from the viewpoint of avoiding damage to the fibers.

After mixing the present fiber mixture and the present liquid mixture, the present separation method preferably includes a step of allowing the liquid mixture after mixing to stand still so that each fiber contained in the present fiber mixture is more clearly and sufficiently separated in the liquid mixture due to the difference in specific gravity as described above.

The standing time may be set as appropriate depending on the state of separation of the fibers contained in the present fiber mixture, but for example, it is preferably 30 minutes or more, and more preferably 1 hour or more. Further, from the viewpoint of the separation efficiency, the standing time is preferably 48 hours or less, and more preferably 24 hours or less.

The temperature at which the mixture is allowed to stand may be maintained at the stirring temperature or may be cooled to a temperature lower than the stirring temperature.

As described above, for example, the modacrylic fiber floats on the top of the present liquid mixture, the polyvinyl chloride fiber settles to the bottom of the present liquid mixture, and both fibers are separated.

Therefore, by separately collecting the upper liquid and the lower liquid of the present liquid mixture in which the fibers contained in the present fiber mixture have been separated, it is possible to recover the liquid containing the respective fibers.

Examples of the present separation method include a method in which the present fiber mixture and the present liquid mixture are put into a separation tank equipped with a stirrer and mixed, stirred and let stand as necessary so that the fibers contained in the present fiber mixture are separated into the upper and lower parts of the separation tank. After separation, each fiber may be recovered by extracting the liquid from the upper and lower parts of the separation tank. The liquid in the upper part of the separation tank may be recovered by overflowing from the separation tank.

Further, the present separation method may also include, for example, a method in which after mixing the present fiber mixture and the present liquid mixture, the present liquid mixture is divided into the upper part and the lower part while being slowly fed, and each is collected separately.

When the present fiber mixture contains three types of fibers: the modacrylic fiber, the polyvinyl chloride fiber and the polyester fiber, each fiber may be recovered by combining the above methods.

Furthermore, the recovered fibers may be further pulverized, melted, remolded or the like into other forms, used as fibers for artificial hair, or used for other purposes.

The recovered fibers or resins may be mixed with other recovered fibers or resins for new purposes or may be mixed with unused fibers or resins for use.

The liquid containing the separated fibers contained in the present fiber mixture may be dried or the like to further recover only the fibers. A new modacrylic fiber, polyvinyl chloride fiber and polyester fiber can be obtained by recovering the fibers contained in the present fiber mixture.

Therefore, the method for producing fibers of the present invention (hereinafter also referred to as "the present production method") includes a separation step of mixing the present fiber mixture and the liquid mixture containing the calcium chloride, the nonionic surfactant and the water and a of spinning step a raw material containing the fibers separated in the separation step.

In the present production method, when the present fiber mixture contains at least the modacrylic fiber, the method for producing the modacrylic fiber (hereinafter also referred to as "the present production method I") includes a separation step of mixing the present fiber mixture containing at least the modacrylic fiber and the liquid mixture containing the calcium chloride, the nonionic surfactant and the water and a step of spinning a raw material containing the modacrylic fiber contained in the fiber mixture separated in the separation step.

when the present fiber mixture contains at least the polyvinyl chloride fiber, the method for producing the polyvinyl chloride fiber (hereinafter also referred to as "the present production method II") includes a separation step of mixing the present fiber mixture containing at least the polyvinyl chloride fiber and the liquid mixture containing the calcium chloride, the nonionic surfactant and the water and a step of spinning a raw material containing the polyvinyl chloride fiber contained in the fiber mixture separated in the separation step.

when the present fiber mixture contains at least the polyester fiber, the method for producing the polyester fiber (hereinafter also referred to as "the present production method III") includes a separation step of mixing the present fiber mixture containing at least the polyester fiber and the liquid mixture containing the calcium chloride, the nonionic surfactant and the water and a step of spinning a raw material containing the polyester fiber contained in the fiber mixture separated in the separation step.

In the present production method I, it is preferable to make the size of the modacrylic fiber separated from the present fiber mixture containing at least the modacrylic fiber (hereinafter also referred to as "present fiber mixture I") as uniform as possible by pulverization or the like, from the viewpoint of maintaining constant quality of the modacrylic fiber obtained spinning as described below.

Regarding the pulverization method, a pulverizer, a pulverization method and energy applied to the pulverization may be set so that the size of the modacrylic fiber after pulverization is as uniform as possible from the above-mentioned viewpoint. For the purpose of efficient crushing, the separated modacrylic fiber may be crushed once and then crushed.

Examples of the pulverization method include impact pulverization, freeze pulverization and mechanical pulverization. A commercially available pulverizer is used as the pulverizer.

The raw material containing the modacrylic fiber separated from the present fiber mixture I in the separation step is spun. The spinning method may be, for example, any one of dry spinning, wet spinning, dry-wet spinning and melt spinning. It is preferable to spin by wet spinning or melt spinning because of high productivity. The conditions for each spinning are appropriately set according to each spinning method.

The raw material containing the separated modacrylic fiber may be the remaining liquid after recovering the remaining fibers from the liquid containing the separated modacrylic fiber and the remaining fibers contained in the present fiber mixture I, or may be obtained by recovering only the modacrylic fiber from the liquid containing the separated modacrylic fibers and the remaining fibers and using the recovered modacrylic fiber as the raw material.

The method of recovery is as described above.

When spinning by dry spinning, wet spinning, or dry-wet spinning, the raw material containing the modacrylic fiber separated in the separation step is mixed with a solvent to form a spinning stock solution.

When preparing the spinning stock solution, water or an organic solvent is used as the solvent. Examples of organic solvents include polar solvents such as dimethyl sulfoxide, N, N-dimethylacetamide, N, N-dimethylformamide, N-methylpyrrolidone, and acetone, polyhydric alcohols such as glycerin and ethylene glycol, and mixtures of these with lithium rhodan salts and swellable metal salts such as chloride, calcium chloride and zinc chloride, as well as mixtures of these solvents together or with water. Dimethyl sulfoxide is particularly preferred from the viewpoints of low temperature solubility, low and toxicity, low corrosivity.

Further, the remaining liquid after recovering the remaining fibers from the liquid containing the separated modacrylic fiber and the remaining fibers contained in the fiber mixture I may be used as the spinning stock solution as it is.

After the spinning step, if necessary, a drying step, a dry stretching step and a heat treatment step may be performed.

In the drying step, it is preferable to dry at 180° C. or lower, and further dry stretching can improve the mechanical performance of the fiber. Dry stretching conditions can be appropriately selected depending on the properties of the modacrylic fiber obtained above, particularly the melting point and desired dissolution temperature in water. The dry stretching ratio after the drying step is preferably about 1.1 to 12 times, and the dry stretching temperature is preferably 100 to 180° C. The dry stretching temperature is preferably 100 to 180° C. from the viewpoint of process passability and the effect of dry stretching, and particularly preferably 110 to 170° C. from the viewpoint of shrinkage rate.

After the dry stretching, it is preferable to perform heat treatment at a temperature of 120 to 180° C. in the heat treatment step. The heat treatment step and the dry stretching may be performed in the same step. As described above, the modacrylic fiber can be produced from the present fiber mixture containing at least the modacrylic fiber.

The present production method II and the present production method III, similarly to the present production method I, include the step of spinning the obtained raw material containing the polyvinyl chloride fiber for polyester fiber after mixing the present fiber mixture containing at least the polyvinyl chloride fiber (hereinafter also referred to as "present fiber mixture II") or the present fiber mixture containing at least the polyester fiber (hereinafter also referred to as "present fiber mixture III"), the calcium chloride, the nonionic surfactant and the water to separate the polyvinyl chloride fiber or the polyester fiber.

Further, as for the spinning methods in the present production methods II and III, similarly to the present production method I, known methods such as dry spinning, wet spinning, dry-wet spinning and melt spinning can be used.

The pulverization method, spinning method or the like are the same as above.

In the present production method I, as raw materials in the spinning step, the modacrylic fiber separated in the separation step and, for example, separately manufactured modacrylic resin or recovered modacrylic fiber may be used in combination.

In the present production method II, as raw materials in the spinning step, the polyvinyl chloride fiber separated in the separation step and, for example, separately manufactured polyvinyl chloride resin or recovered polyvinyl chloride fiber may be used in combination.

In the present production method III, as raw materials in the spinning step, the polyester fiber separated in the separation step and, for example, separately manufactured polyester resin or recovered polyester fiber may be used in combination.

Although the present separation method and the present production method have been described above, the present invention is not limited to the configurations of the embodiments described above.

The present separation method and the present production method may include any other process added to the configuration of the embodiment described above, or may be replaced with any process that performs the same function.

EXAMPLES

The present invention will be further explained below with reference to Examples. However, the scope of the present invention is not limited to these examples.

In Examples and Comparative Examples, the following fibers cut to a length of 5 mm were used.

Modacrylic fiber:
Manufactured by Kaneka Co., Ltd., product name "Afrelle", single fiber fineness 46 dtex, specific gravity 1.29
Polyvinyl chloride fiber (hereinafter also referred to as PVC fiber):
Manufactured by Kaneka Co., Ltd., product name "ADM", single fiber fineness 72 dtex, specific gravity 1.39
Polyester fiber (hereinafter also referred to as PET fiber):
Manufactured by Kaneka Co., Ltd., product name "Futura", single fiber fineness 65 dtex, specific gravity 1.47
In addition, the specific gravity of the prepared liquid mixture was measured according to JIS K 0061:2001.

EXAMPLE A1

<Preparation of liquid mixture>

67.5 parts by mass of ion-exchanged water was added to 32 parts by mass of calcium chloride (manufactured by Fujifilm Wako Pure Chemical Industries, Ltd.), and a mixture obtained was stirred at room temperature for 10 minutes at 700 rpm using a stirrer (manufactured by As One Corporation, model number "RSH-4DR") to prepare an aqueous calcium chloride solution. 0.5 Next, parts by mass of polyoxyethylene (20) sorbitan monolaurate (manufactured by Fujifilm Wako Pure Chemical Industries, Ltd.), which is a nonionic surfactant, was added to the calcium chloride aqueous solution, and a mixture obtained was stirred at 45° C. for 1 hour at 700 rpm using the stirrer (manufactured by As One Corporation, model number "RSH-4DR") to prepare a liquid mixture containing 32% by mass of the calcium chloride and 0.5% by mass of the polyoxyethylene (20) sorbitan monolaurate. The obtained liquid mixture was in the state of a homogeneous aqueous solution and had a specific gravity of 1.297.

<Immersion Test of PVC Fiber>

0.1 g of PVC fiber was added to 50 g of the liquid mixture obtained above, and a mixture obtained was stirred at room temperature for 1 minute at 700 rpm using the stirrer (manufactured by As One Corporation, model number "RSH-4DR") and then allowed to stand at room temperature for 24 hours.

All of the PVC fibers settled to the bottom of the liquid.

EXAMPLE A2 and COMPARATIVE EXAMPLES A1 to A7

Liquid mixtures were prepared in the same manner as in Example A1, except that the types and amounts of specific gravity adjusting salt, surfactant and concentration shown in Table 1 were used, and the immersion tests of the PVC fibers were conducted.

<Separation Test of Modacrylic Fiber and PVC Fiber>

EXAMPLE B1

A liquid mixture was prepared in the same manner as in Example A1, and 0.1 g of modacrylic fiber and 0.1 g of PVC fiber were added to 200 g of the liquid mixture obtained above. Next the liquid mixture obtained was stirred at room temperature for 1 minute at 700 rpm using the stirrer (manufactured by As One Corporation, model number "RSH-4DR") and then allowed to stand at room temperature for 24 hours to conduct a separation test of fibers. The obtained liquid mixture was in the state of a homogeneous aqueous solution and had a specific gravity of 1.297.

All of the modacrylic fibers floated on the liquid surface, and all of the PVC fibers settled to the bottom of the liquid, making it possible to separate them.

EXAMPLE B2

A liquid mixture was prepared in the same manner as in Example A2, and the separation test of fibers was conducted in the same manner as in Example B1. The obtained liquid mixture was in the state of a homogeneous aqueous solution and had a specific gravity of 1.303.

All of the modacrylic fibers floated on the liquid surface, and all of the PVC fibers settled to the bottom of the liquid, making it possible to separate them.

COMPARATIVE EXAMPLE B1

A liquid mixture was prepared in the same manner as in Comparative Example A1, and the separation test of fibers was conducted in the same manner as in Example B1. The obtained liquid mixture was in the state of a homogeneous aqueous solution and had a specific gravity of 1.300.

Although all of the modacrylic fibers floated on the liquid surface, many PVC fibers also floated on the liquid surface, so it was not possible to separate them.

The results of the immersion tests of the PVC fibers are Table 1, shown in and the results of the separation tests of the modacrylic fibers and the PVC fibers are shown in Table 2. In Tables 1 and 2, when a uniform aqueous solution was prepared result of as a liquid preparation, it was marked with OK, and when the surfactant was not dissolved in the salt aqueous solution and a uniform aqueous solution could not be prepared, it was marked as NG. For the liquid mixtures in which a uniform aqueous solution could not be prepared, specific gravity could not be measured because there was a large amount of undissolved material in the liquid.

In Table 1, the behavior of the PVC fibers was visually confirmed, and when all of the PVC fibers settled to the bottom of the liquid, it was marked with OK, and when there were PVC fibers floating on the liquid surface, it was marked with NG. In addition, in Table 2, the separation of the modacrylic fibers and the PVC fibers was visually confirmed, and when both fibers were separated, it was marked with OK, and when both fibers were not separated, it was marked with NG.

TABLE 1

| Example/ Comparative example | Specific gravity adjusting salt | | | Surfactant | | Liquid preparation | Specific gravity | PVC fiber |
|---|---|---|---|---|---|---|---|---|
| Example A1 | Calcium chloride | 32% by mass | Nonionic surfactant | Polyoxyethylene (20) sorbitan monolaurate | 0.5% by mass | OK | 1.297 | OK |
| Example A2 | Calcium chloride | 32% by mass | Nonionic surfactant | Polyoxyethylene (20) sorbitan monooleate | 0.5% by mass | OK | 1.303 | OK |
| Comparative Example A1 | Calcium chloride | 32% by mass | — | — | — | OK | 1.300 | NG |
| Comparative Example A2 | Calcium chloride | 32% by mass | Anionic surfactant | Sodium dodecyl sulfate | 0.5% by mass | NG | — | NG |
| Comparative Example A3 | Calcium chloride | 32% by mass | Cationic surfactant | Benzyldimethyltetradecylammonium chloride | 0.5% by mass | NG | — | NG |
| Comparative Example A4 | Potassium carbonate | 33.2% by mass | — | — | — | OK | 1.326 | NG |
| Comparative Example A5 | Potassium carbonate | 33.2% by mass | Nonionic surfactant | Polyoxyethylene (20) sorbitan monolaurate | 0.5% by mass | NG | — | NG |
| Comparative Example A6 | Potassium carbonate | 33.2% by mass | Antonic surfactant | Sodium dodecyl sulfate | 0.5% by mass | NG | — | NG |
| Comparative Example A7 | Potassium carbonate | 33.2% by mass | Cationic surfactant | Benzyldimethyltetradecylammonium chloride | 0.5% by mass | NG | — | NG |

TABLE 2

| Example/ Comparative example | Specific gravity adjusting salt | | | Surfactant | | Liquid preparation | Specific gravity | Modacrylic fiber/PVC fiber separation |
|---|---|---|---|---|---|---|---|---|
| Example B1 | Calcium chloride | 32% by mass | Nonionic surfactant | Polyoxyethylene (20) sorbitan monolaurate | 0.5% by mass | OK | 1.297 | OK |
| Example B2 | Calcium chloride | 32% by mass | Nonionic surfactant | Polyoxyethylene (20) sorbitan monooleate | 0.5% by mass | OK | 1.303 | OK |
| Comparative Example B1 | Calcium chloride | 32% by mass | — | — | — | OK | 1.300 | NG |

<Immersion Test of PET Fiber>

Examples C1 to C2 and Comparative Examples C1 to C7 Liquid mixtures were prepared in the same manner as in Example A1, except that PET fibers were used instead of PVC fibers, and the types and amounts of specific gravity adjusting salts, surfactants, and concentrations shown in Table 3 were used, and the immersion tests of the PET fibers were conducted.

<Separation Test of Modacrylic Fiber and PET Fiber>

EXAMPLE D1

A liquid mixture was prepared in the same manner as in Example C1, and 0.1 g of modacrylic fiber and 0.1 g of PET fiber were added to 200 g of the liquid mixture obtained above. Next the liquid mixture obtained was stirred at room temperature for 1 minute at 700 rpm using the stirrer (manufactured by As One Corporation, model number "RSH-4DR") and then allowed to stand at room temperature for 24 hours to conduct a separation test of fibers. The obtained liquid mixture was in the state of a homogeneous aqueous solution and had a specific gravity of 1.396.

All of the modacrylic fibers floated on the liquid surface, and all of the PET fibers settled to the bottom of the liquid, making it possible to separate them.

EXAMPLE D2

A liquid mixture was prepared in the same manner as in Example C2, and the separation test of fibers was conducted in the same manner as in Example D1. The obtained liquid mixture was in the state of a homogeneous aqueous solution and had a specific gravity of 1.393.

All of the modacrylic fibers floated on the liquid surface, and all of the PET fibers settled to the bottom of the liquid, making it possible to separate them.

COMPARATIVE EXAMPLE D1

A liquid mixture was prepared in the same manner as in Comparative Example C1, and the separation test of fibers was conducted in the same manner as in Example D1. The obtained liquid mixture was in the state of a homogeneous aqueous solution and had a specific gravity of 1.393.

Although all of the modacrylic fibers floated on the liquid surface, many PET fibers also floated on the liquid surface, so it was not possible to separate them.

<Separation Test of PVC Fiber and PET Fiber>

EXAMPLE E1

A liquid mixture was prepared in the same manner as in Example C1, and 0.1 g of PVC fiber and 0.1 g of PET fiber were added to 200 g of the liquid mixture obtained above. Next the liquid mixture obtained was s stirred at room temperature for 1 minute at 700 rpm using the stirrer (manufactured by As One Corporation, model number "RSH-4DR") and then allowed to stand at room temperature for 24 hours to conduct a separation test of fibers. The obtained liquid mixture was in the state of a homogeneous aqueous solution and had a specific gravity of 1.396.

All of the PVC fibers floated on the liquid surface, and all the PET fibers settled to the bottom of the liquid, making it possible to separate them.

EXAMPLE E2

A liquid mixture was prepared in the same manner as in Example C2, and the separation test of fibers was conducted in the same manner as in Example E1. The obtained liquid mixture was in the state of a homogeneous aqueous solution and had a specific gravity of 1.393.

All of the PVC fibers floated on the liquid surface, and all of the PET fibers settled to the bottom of the liquid, making it possible to separate them.

COMPARATIVE EXAMPLE E1

A liquid mixture was prepared in the same manner as in Comparative Example C1, and the separation test of fibers was conducted in the same manner as in Example E1. The obtained liquid mixture was in the state of a homogeneous aqueous solution and had a specific gravity of 1.393.

Although all of the PVC fibers floated on the liquid surface, many PET fibers also floated on the liquid surface, so it was not possible to separate them.

The results of the immersion tests of the PET fibers are shown in Table 3, and the results of the separation tests of the modacrylic fibers and the PET fibers are shown in Table 4. Further, the results of the separation tests between the PVC fibers and PET fibers are shown in Table 5. In Tables 3 to 5, when a uniform aqueous solution was prepared as a result of liquid preparation, it was marked with OK, and when the surfactant was not dissolved in the salt aqueous solution and a uniform aqueous solution could not be prepared, it was marked as NG. For the liquid mixtures in which a uniform aqueous solution could not be prepared, specific gravity could not be measured because there was a large amount of undissolved material in the liquid.

In Table 3, the behavior of the PET fibers was visually confirmed, and when all of the PET fibers settled to the bottom of the liquid, it was marked with OK, and when there were PET fibers floating on the liquid surface, it was marked with NG. Further, in Table 4, the separation of the modacrylic fibers and PET the fibers was visually confirmed, and when both fibers were separated, it was marked with OK, and when both fibers were not separated, it was marked with NG. Furthermore, in Table 5, the separation of the PVC fibers and the PET fibers was visually confirmed, and when both fibers were separated, it was marked with OK, and when both fibers were not separated, it was marked with NG.

TABLE 3

| Example/Comparative example | Specific gravity adjusting salt | | Surfactant | | | Liquid preparation | Specific gravity | PET fiber |
|---|---|---|---|---|---|---|---|---|
| Example C1 | Calcium chloride | 42% by mass | Nonionic surfactant | Polyoxyethylene (20) sorbitan monolaurate | 0.5% by mass | OK | 1.396 | OK |
| Example C2 | Calcium chloride | 42% by mass | Nonionic surfactant | Polyoxyethylene (20) sorbitan monooleate | 0.5% by mass | OK | 1.393 | OK |

TABLE 3-continued

| Example/ Comparative example | Specific gravity adjusting salt | | Surfactant | | | Liquid preparation | Specific gravity | PET fiber |
|---|---|---|---|---|---|---|---|---|
| Comparative Example C1 | Calcium chloride | 42% by mass | — | — | — | OK | 1.393 | NG |
| Comparative Example C2 | Calcium chloride | 42% by mass | Anionic surfactant | Sodium dodecyl sulfate | 0.5% by mass | NG | — | NG |
| Comparative Example C3 | Calcium chloride | 42% by mass | Cationic surfactant | Benzyldimethyltetradecylammonium chloride | 0.5% by mass | NG | — | NG |
| Comparative Example C4 | Potassium carbonate | 33.2% by mass | — | — | — | OK | 1.326 | NG |
| Comparative Example C5 | Potassium carbonate | 33.2% by mass | Nonionic surfactant | Polyoxyethylene (20) sorbitan monolaurate | 0.5% by mass | NG | — | NG |
| Comparative Example C6 | Potassium carbonate | 33.2% by mass | Anionic surfactant | Sodium dodecyl sulfate | 0.5% by mass | NG | — | NG |
| Comparative Example C7 | Potassium carbonate | 33.2% by mass | Cationic surfactant | Benzyldimethylterradecylammonium chloride | 0.5% by mass | NG | — | NG |

TABLE 4

| Exemple/ Comparative example | Specific gravity adjusting salt | | Surfactant | | | Liquid preparation | Specific gravity | Modacrylic fiber/PET fiber separation |
|---|---|---|---|---|---|---|---|---|
| Example D1 | Calcium chloride | 42% by mass | Nonionic surfactant | Polyoxyethylene (20) sorbitan monolaurate | 0.5% by mass | OK | 1.396 | OK |
| Example D2 | Calcium Caloride | 42% by mass | Nonionic surfactant | Polyoxyerhylene (20) sorbitan monooleate | 0.5% by mass | OK | 1.393 | OK |
| Comparative Example D1 | Calcium Chloride | 42% by mass | — | — | — | OK | 1.393 | NG |

TABLE 5

| Example/ Comparative example | Specific gravity adjusting salt | | Surfactant | | | Liquid preparation | Specific gravity | PVC fiber/PET fiber separation |
|---|---|---|---|---|---|---|---|---|
| Example E1 | Calcium chloride | 42% by mass | Nonionic surfactant | Polyoxyethylene (20) sorbitan monolaurate | 0.5% by mass | OK | 1.396 | OK |
| Example E2 | Calcium chloride | 42% by mass | Nonionic surfactant | Polyoxyethylene (20) sorbitan monooleate | 0.5% by mass | OK | 1.393 | OK |
| Comparative Example E1 | Calcium chloride | 42% by mass | — | — | — | OK | 1.393 | NG |

From the above results, it can be seen that by using the present separation method, the modacrylic fiber and the polyvinyl chloride fiber, the modacrylic fiber and the polyester fiber, and the polyvinyl chloride fiber and the polyester fiber can be sufficiently separated easily and at low cost.

Further, the modacrylic fiber, the polyvinyl chloride fiber and the polyester fiber after separation can be used again as each fiber by recovering them by the method described above.

What is claimed is:

1. A method for separating fibers contained in a fiber mixture from the fiber mixture, the method comprising:
    a step of mixing the fiber mixture containing at least two selected from the group consisting of a modacrylic fiber, a polyvinyl chloride fiber and a polyester fiber, and a liquid mixture containing calcium chloride, a nonionic surfactant and water.

2. The method for separating fibers as claimed in claim 1, wherein a specific gravity of the liquid mixture is 1.25 or more and 1.45 or less.

3. The method for separating fibers as claimed in claim 1, wherein a concentration of the nonionic surfactant in the liquid mixture is 0.05% by mass or more and 5% by mass or less.

4. The method for separating fibers as claimed in claim 1, wherein the nonionic surfactant contains polyoxyethylene sorbitan fatty acid ester.

5. The method for separating fibers as claimed in claim 1, wherein a concentration of the calcium chloride in the liquid mixture is 31% by mass or more and 45% by mass or less.

6. A method for producing a fiber, the method comprising:
    a separation step of mixing a fiber mixture containing at least two selected from the group consisting of a modacrylic fiber, a polyvinyl chloride fiber and a polyester fiber, and a liquid mixture containing calcium chloride, a nonionic surfactant and water; and
    a step of spinning a raw material containing a material obtained from a fiber separated in the separation step.

* * * * *